3,317,543
1 - HYDROXY - 1 - (2 - PYRIDYL)-2,3,6,7-DIBENZO-2,6-CYCLOOCTADIENE; 1-(2-PYRIDYL)-2,3,6,7-DIBENZO-2,6,8-CYCLOOCTATRIENE AND THE HYDROCHLORIDE ACID ADDITION SALTS THEREOF

Leslie G. Humber, Dollard des Ormeaux, Quebec, Canada, assignor to American Home Products Corporation, New York, N.Y., a corporation of Delaware
No Drawing. Filed June 15, 1965, Ser. No. 464,183
5 Claims. (Cl. 260—290)

This invention relates to certain novel derivatives of 2,3,6,7-dibenzo-2,6-cyclooctadiene, containing substituents in the 1-position. These derivatives possess valuable pharmacological properties and this invention also relates to a process for the preparation of said derivatives.

The new pharmacologically active compounds of this invention may be represented by the generic structural Formula I.

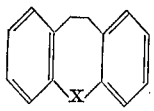

wherein X may be

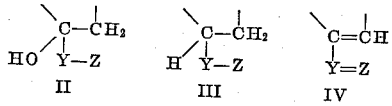

and where Y may be an aromatic moiety such as for example: phenyl, pyridyl, pyrazinyl, thienyl, or furyl, and Z is an aminoalkyl, alkylaminoalkyl or dialkylamino moiety containing from three to twenty carbon atoms.

The dibenzocyclooctadiene derivatives of this invention are basic in nature and form acid addition salts. Such salts with pharmacologically acceptable acids are biologically equivalent to the free base. The compounds of this invention are useful as antiinflammatory, antibacterial, trichomonicidal and antigonadotrophic agents.

The compounds of this invention may be administered orally, by injection, or topically. For oral administration they may be formulated with excipients such as starch, lactose, magnesium silicate, and magnesium stearate in the form of tablets or capsule containing from 5–500 mg. of the active ingredient. Such tablets or capsule may be administered up to five times per day.

For injection, the free bases of this invention may be dissolved under sterile conditions in oily vehicles such as, for example, sesame oil or olive oil, at concentrations of from 1–20 mg./ml.

For topical administration the compounds of this invention may be formulated in the form of creams, ointments, jellies, lotions, or dusting powders, containing from 0.1 to 1 percent of the active ingredient.

The compounds of this invention are conveniently prepared by reacting compound I with X=—CO—CH$_2$— (Leonard et al., J. Am. Chem. Soc., 77, 5078 (1955)) with a compound of the formula Y—Z in the presence of a suitable basic condensing agent such as, for example, an alkali metal amide, alkoxide, alkyl, or aryl, to yield the corresponding 1-hydroxy derivatives of Formula I in which X represents the group II. The latter compounds may be treated with an appropriate dehydrating agent such as, for example, a mineral acid or an organic anhydride, to yield the corresponding olefins of Formula I in which X represents the group IV, and the latter compounds may be hydrogenated, for example, with hydrogen in the presence of a noble metal catalyst to yield the saturated compounds of Formula I in which X represents the group III.

Alternatively, the last-named compounds may be obtained directly from the compounds of Formula I in which X represents the group II by treatment with a suitable hydrogenolyzing agent such as, for example, hydrogen iodide and red phosphorus, or hydrogen in the presence of a noble metal catalyst.

The compounds of generic Formula I may be transformed to salts by reacting them with a pharmacologically acceptable acid.

EXAMPLE I

*1-hydroxy-1-(2-pyridyl)-2,3,6,7-dibenzo-2,6-cyclooctadiene hydrochloride*

Butyl lithium (32 ml. of a 15.05% solution in hexane, 0.076 mole) is added to a dry flask, cooled to −60° C. and stirred. 2-bromopyridine (10.42 gm., 0.066 mole) is dissolved in tetrahydrofuran (10 ml.) and added dropwise over 5 minutes. 2,3,6,7-dibenzo-2,6-cyclooctadienone (13.34 gm., 0.06 mole), dissolved in 40 ml. of tetrahydrofuran, is added over 10 minutes. The dark mixture is stirred at −40° C. for 2 hrs. then allowed to stir at +20° C. overnight. Sixty milliliters of 5% aqueous ammonium chloride solution are added, the organic phase separated, washed with water, dried and evaporated to yield an oil which is treated with an excess of ethereal hydrogen chloride to yield a white solid which is crystallized three times from a 1:1 methanol:chloroform mixture to yield the title compound, M.P. 248–250° C.

EXAMPLE II

*1-hydroxy-1-(2-dimethylaminomethylphenyl)-2,3,6,7-dibenzo-2,6-cyclooctadiene*

Benzyldimethylamine (5.06 gm., 0.037 mole) is lithiated in the ortho position with butyl lithium (0.45 mole) in ether with stirring at room temperature for 24 hours. The resulting mixture is added over one half hour to a refluxing ether solution (75 ml.) of 2,3,6,7-dibenzo-2,6-cyclooctadienone (11.0 gm., 0.0495 mole). The reaction mixture is worked up in the conventional manner to yield some non-basic material identified as the starting ketone. The basic fraction is a mixture of starting amine and title compound as indicated by thin layer chromatography. The title compound is separated by crystallization from a chloroform-ether mixture to be obtained as a solid with M.P. 196–197° C. recrystallized from chloroform-ether to M.P. 197–198° C.

EXAMPLE III

*1-(2-pyridyl)2,3,6,7-dibenzo-2,6,8-cyclooctatriene*

1 - hydroxy-1-(2-pyridyl)-2,3,6,7-dibenzo-2,6-cyclooctadiene (5.0 gm.) is refluxed in a mixture of acetic acid (80 ml.) and concentrated hydrochloric acid (5 ml.) for four hours. Evaporation of the solvents in vacuo yields a residue which is distributed between chloroform and aqueous sodium hydroxide. The chloroform phase yields the title compound which is crystallized from acetone.

EXAMPLE IV

*1-(2-pyridyl)-2,3,6,7-dibenzo-2,6-cyclooctadiene*

1-(2-pyridyl)-2,3,6,7-dibenzo-2,6,8-cyclooctatriene (3.2 gm.), obtained as in Example III, is dissolved in 75 ml. of absolute ethanol and hydrogenated over an Adam's platinum catalyst (100 mg.) at ambient temperature and pressure to yield the title compound as a solid when crystallized from an acetone-hexane mixture.

EXAMPLE V

*1-(2-dimethylaminomethyl)-2,3,6,7-dibenzo-2,6,8-cyclooctatriene*

1 - hydroxy - 1-(2-dimethylaminomethylphenyl)-2,3,6, 7-dibenzo-2,6-cyclooctadiene (15 gm.), obtained as in Example II, is dissolved in acetic anhydride (150 ml.) and heated to reflux for three hours. The mixture is cooled and added slowly to ice-cold aqueous sodium hydroxide. The precipitated title product is washed well with water and crystallized from isopropanol.

EXAMPLE VI

*1-(2-dimethylaminomethylphenyl)-2,3,7-dibenzo-2,6-cyclooctadiene*

1 - hydroxy - 1-(2-dimethylaminomethylphenyl)-2,3,6,7-dibenzo-2,6-cyclooctadiene (10.0 gm.), prepared as in Example II, is dissolved in a mixture of glacial acetic acid (100 ml.) and 56% hydriodic acid (100 ml.) containing red phosphorus (10.0 gm.). The mixture is refluxed for 24 hours, filtered while hot and the filtrate evaporated in vacuo. The resultant residue is distributed between chloroform and aqueous sodium hydroxide. The chloroform phase yields the title product after drying and evaporation.

EXAMPLE VII

The compounds obtained in Examples II, III, IV, V and VI, are treated in ether solution with hydrogen chloride to obtain the corresponding hydrochloride salts of 1 - hydroxy-1(2-dimethylaminomethylphenyl)-2,3,6,7-dibenzo - 2,6-cyclooctadiene, 1-(2-pyridyl)-2,3,6,7-dibenzo-2,6,8 - cyclooctatriene, 1-(2-pyridyl)-2,3,6,7-dibenzo-2,6-cyclooctadiene, 1-(2-dimethylaminomethylphenyl)-2,3,6,7-dibenzo-2,6,8-cyclooctatriene, and 1-(2-dimethylaminomethylphenyl)-2,3,7-dibenzo-2,6-cyclooctadiene.

I claim:

1. A compound selected from the group which consists of compounds of the formula

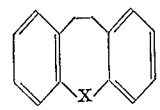

wherein X is selected from the group which consists of

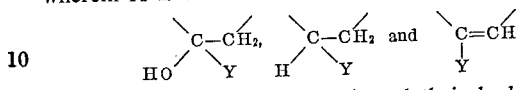

wherein Y represents 2-pyridyl; and their hydrochloride salts.

2. 1 - hydroxy - 1-(2-pyridyl)-2,3,6,7-dibenzo-2,6-cyclooctadiene.

3. 1 - (2 - pyridyl) 2,3,6,7 dibenzo-2,6,8-cyclooctatriene.

4. 1 - (2-pyridyl)-2,3,6,7 dibenzo-2,6-cyclooctadiene.

5. The hydrochloride salt of 1-hydroxy-1-(2-pyridyl)-2,3,6,7-dibenzo-2,6-cyclooctadiene.

References Cited by the Examiner

Burger, Medicinal Chemistry, Interscience, 2nd Edition, page 78.

Curtin et al., J. Am. Chem. Soc., vol. 81, pages 4719–28 (1964).

Winthrop et al., J. Org. Chem., vol. 27, pages 230–40 (1962).

WALTER A. MODANCE, *Primary Examiner.*

ALAN L. ROTMAN, *Assistant Examiner.*